United States Patent
Yamamoto

(10) Patent No.: US 8,422,785 B2
(45) Date of Patent: Apr. 16, 2013

(54) IMAGE PROCESSING APPARATUS, IMAGE PROCESSING METHOD, AND PROGRAM

(75) Inventor: Hiroyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 12/642,320

(22) Filed: Dec. 18, 2009

(65) Prior Publication Data

US 2010/0165421 A1    Jul. 1, 2010

(30) Foreign Application Priority Data

Dec. 25, 2008 (JP) ................. 2008-330382

(51) Int. Cl.
*G06K 9/34* (2006.01)
*G06K 9/00* (2006.01)
*H04N 1/04* (2006.01)
*H04N 1/387* (2006.01)

(52) U.S. Cl.
USPC ............ 382/173; 382/168; 358/474; 358/453

(58) Field of Classification Search ......................... None
See application file for complete search history.

(56) References Cited

U.S. PATENT DOCUMENTS

| 4,642,699 | A  * | 2/1987  | Ohi .............................. 358/450 |
| 6,738,154 | B1 * | 5/2004  | Venable ....................... 358/1.15 |
| 6,903,844 | B1 * | 6/2005  | Kamiya ......................... 358/2.1 |
| 2003/0059111 | A1 * | 3/2003 | Druitt et al. .................. 382/173 |
| 2004/0136609 | A1 * | 7/2004 | Ichikawa et al. ............... 382/284 |
| 2005/0024681 | A1 * | 2/2005 | Tehrani et al. ................ 358/1.18 |
| 2005/0163382 | A1 * | 7/2005 | Herley ......................... 382/199 |
| 2006/0215219 | A1 * | 9/2006 | Yorimoto et al. ............ 358/1.15 |
| 2006/0221411 | A1   | 10/2006 | Aoki |
| 2007/0013974 | A1   | 1/2007 | Hattori |
| 2007/0189615 | A1 * | 8/2007 | Liu et al. ..................... 382/232 |

FOREIGN PATENT DOCUMENTS

| JP | 2000-232562 A | 8/2000 |
| JP | 2002-016798 A | 1/2002 |
| JP | 2003-46731 A  | 2/2003 |
| JP | 2006-287360 A | 10/2006 |
| JP | 2007-20122 A  | 1/2007 |

* cited by examiner

*Primary Examiner* — Wenpeng Chen
*Assistant Examiner* — Feng Niu
(74) *Attorney, Agent, or Firm* — Canon USA Inc IP Division

(57) ABSTRACT

An image processing apparatus obtains an image of an original area on the basis of a platen image obtained by reading an entire surface of a platen including an original placed on the platen. The image processing apparatus extracts a plurality of image areas included in the platen image, and determines whether each of the extracted image areas has a specific characteristic. The image processing apparatus judges that a rectangular area including all of the plurality of image areas is an original image in a case where at least one of the plurality of image areas has the specific characteristic, and judges that each of the plurality of image areas is an original image in a case where none of the plurality of image areas has the specific characteristic.

7 Claims, 12 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus that reads an original placed on a platen of an image reading apparatus and that outputs an appropriate original image on the basis of a read image.

2. Description of the Related Art

With the development of communication networks, the increasing speed of computers, and the increasing capacity of storage media in recent years, image information is frequently handled. Particularly, there has been increasing demand for image information captured by a scanner or the like to be read with higher accuracy and at higher speed.

Hitherto, methods for extracting an object to be read from an original placed on a platen and automatically determining an original area defined by the position, size, and the like of the original, have been known. A first method therefor is a method for determining an original area on the basis of all extracted objects to be read, as described in Japanese Patent Laid-Open No. 2000-232562. The first method is effective in a case where it is recognized in advance that only one original is placed on the platen.

A second method is a method for extracting individual objects to be read from a plurality of objects to be read and determining original areas on the basis of the extracted individual objects to be read, as described in Japanese Patent Laid-Open Nos. 2003-46731 and 2007-20122. The second method is based on the assumption that the number of originals is not limited to one. In this method, original areas can be determined for individual objects to be read.

In the first existing method for determining an original area on the basis of all objects to be read, a process is performed under the assumption that the number of originals is one, and thus one original area is determined even in a case where a plurality of originals are placed on a platen. Therefore, in a case where a plurality of originals are placed on the platen, there is a disadvantage in that appropriate original areas are not determined.

On the other hand, in the second existing method, individual objects to be read are extracted from a plurality of objects to be read and original areas are determined on the basis of the extracted individual objects to be read, and thus appropriate original areas can be determined. However, in a case where a photograph or the like is included in a single original, such as in a magazine, the photograph can be extracted as an independent object to be read (a single original).

In such a case of determining an original area, a user may be allowed to select an appropriate process. However, there is a problem in that it is difficult for an inexperienced user to determine which process is appropriate for an original placed on a platen.

Furthermore, there is a problem of an additional complicated operation "a user selects an appropriate process for an original placed by the user". This problem hinders realization of a function of being able to obtain an image in an optimal read area for an original when a user places the original on a platen and presses a read button. That is, it has been difficult to obtain an image in an appropriate original area in a case where a single original or a plurality of originals are placed on the platen.

SUMMARY OF THE INVENTION

The present invention has been made in view of the above-described problems and provides an image processing apparatus, an image processing method, and a program that enable acquisition of an appropriate original area in both cases where a single original is placed on a platen and where a plurality of originals are placed on the platen.

According to an aspect of the present invention, there is provided an image processing apparatus that outputs an original image of an original on the basis of a platen image obtained by reading a platen on which the original is placed. The image processing apparatus includes an image extracting unit, a determining unit, a judging unit, and an output unit. The image extracting unit extracts a plurality of image areas included in the platen image. The determining unit determines whether each of the plurality of image areas that are extracted has a characteristic indicating that the image area is constituted by characters. The judging unit judges that the original is formed of one original and that a rectangular area including the plurality of image areas is an original image in a case where at least one of the plurality of image areas has the characteristic, and judges that the original is formed of a plurality of originals and that each of the plurality of image areas is an original image in a case where none of the plurality of image areas has the characteristic. The output unit outputs the original image.

With this configuration, an image of an appropriate original area can be obtained in both cases where a single original is placed on a platen and where a plurality of originals are placed on the platen.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the attached drawings.

First Embodiment

Figure 1:
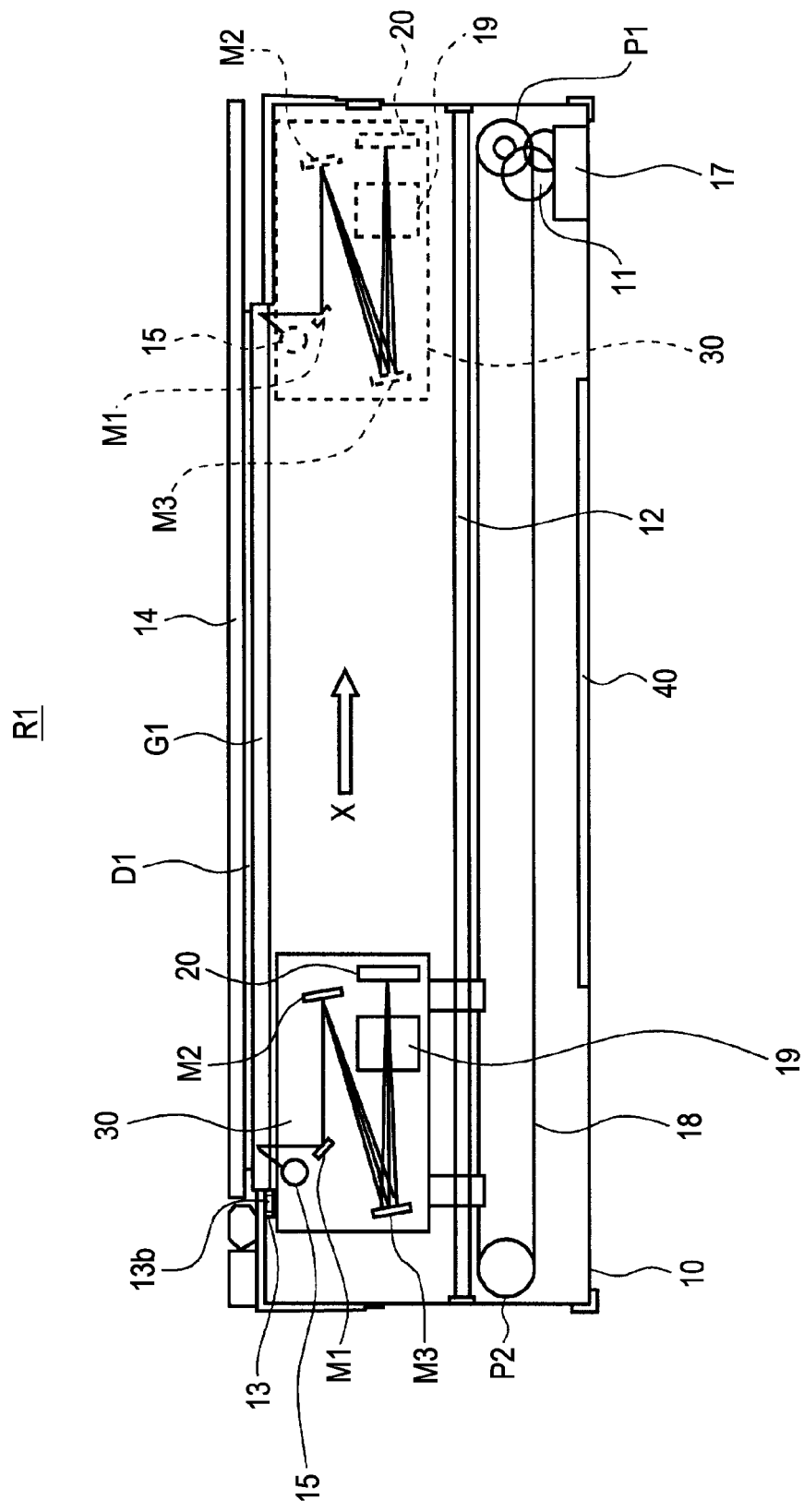
FIG. 1 is a cross-sectional view illustrating an image reading apparatus according to a first embodiment of the present invention.

FIG. 1 is a cross-sectional view illustrating an image reading apparatus R1 according to a first embodiment of the present invention.

The image reading apparatus R1 includes a scanner 10, on which an original D1 to be read is placed. The scanner 10 is connected to a host computer (hereinafter referred to as host PC 50) through an interface cable (not illustrated).

The image reading apparatus R1 includes pulleys P1 and P2, a platen glass G1, a gear train 11, a guide rail 12, a white reference plate 13, a pressure plate 14, a pulse motor 17, an endless belt 18, an optical unit 30, and an electric board 40.

A black mark 13b is provided in the white reference plate 13. The scanner 10 determines a read area on the basis of the black mark 13b and reads an image.

The optical unit 30 and the pulse motor 17 are electrically connected to each other through a cable (not illustrated). The optical unit 30 is capable of sliding along the guide rail 12, and is fixed to the endless belt 18.

The optical unit 30 includes a reflective-original light source 15 (a light source for a reflective original), a plurality of reflective mirrors M1, M2, and M3, an image forming lens 19, and a line sensor 20 serving as an image pickup unit.

Next, an operation of reading a reflective original image performed by the scanner 10 will be described.

In response to a read command issued by the host PC 50, the scanner 10 starts a reading operation. The scanner 10 lights the reflective-original light source 15 of the optical unit 30, allows the reflective mirrors M1, M2, and M3 to reflect reflected light from the original D1, and forms an image onto the line sensor 20 via the image forming lens 19, thereby reading an image on one line in a main scanning direction.

The pulley P1 is rotated by power of the pulse motor 17 via the gear train 11, so that the endless belt 18 is driven. Accordingly, the optical unit 30 fixed to the endless belt 18 moves on the guide rail 12 in a sub scanning direction indicated by an arrow X.

The scanner 10 repeats reading of a line image in the main scanning direction while moving the optical unit 30 in the sub scanning direction. That is, the scanner 10 moves the optical unit 30 while performing a reading operation to the position indicated by a dotted line in FIG. 1, thereby scanning an entire surface of the platen glass G1.

The scanner 10 is capable of reading a partial image of an original on the platen glass G1 in accordance with a read command supplied from the host PC 50. In this case, a control unit on the electric board 40 specifies a pixel area to be adopted in a sensor output in the main scanning direction with respect to an image area to be read specified by the host PC 50, whereby a partial image of the original D1 on the platen glass G1 can be read.

In the sub scanning direction, the control unit on the electric board 40 specifies a movement area of the optical unit 30, whereby the partial image of the original D1 on the platen glass G1 is read. In a case where the optical unit 30 is allowed to move in the sub scanning direction, a system controller 41 (described below) selects a speed in accordance with the setting of resolution for reading an image specified by the host PC 50, and then an image is read.

The scanner 10 has a multi-cropping scanning function capable of extracting a plurality of original image areas from a platen image, and automatically reads a plurality of originals D1 placed on the platen glass G1 one after another under control by the host PC 50 or the scanner 10 itself.

An operation panel is provided on the pressure plate 14, and the operation panel is provided with a liquid crystal screen and buttons. A user inputs a parameter of multi-cropping to the scanner 10 and performs an operation to start reading or the like.

Figure 2:
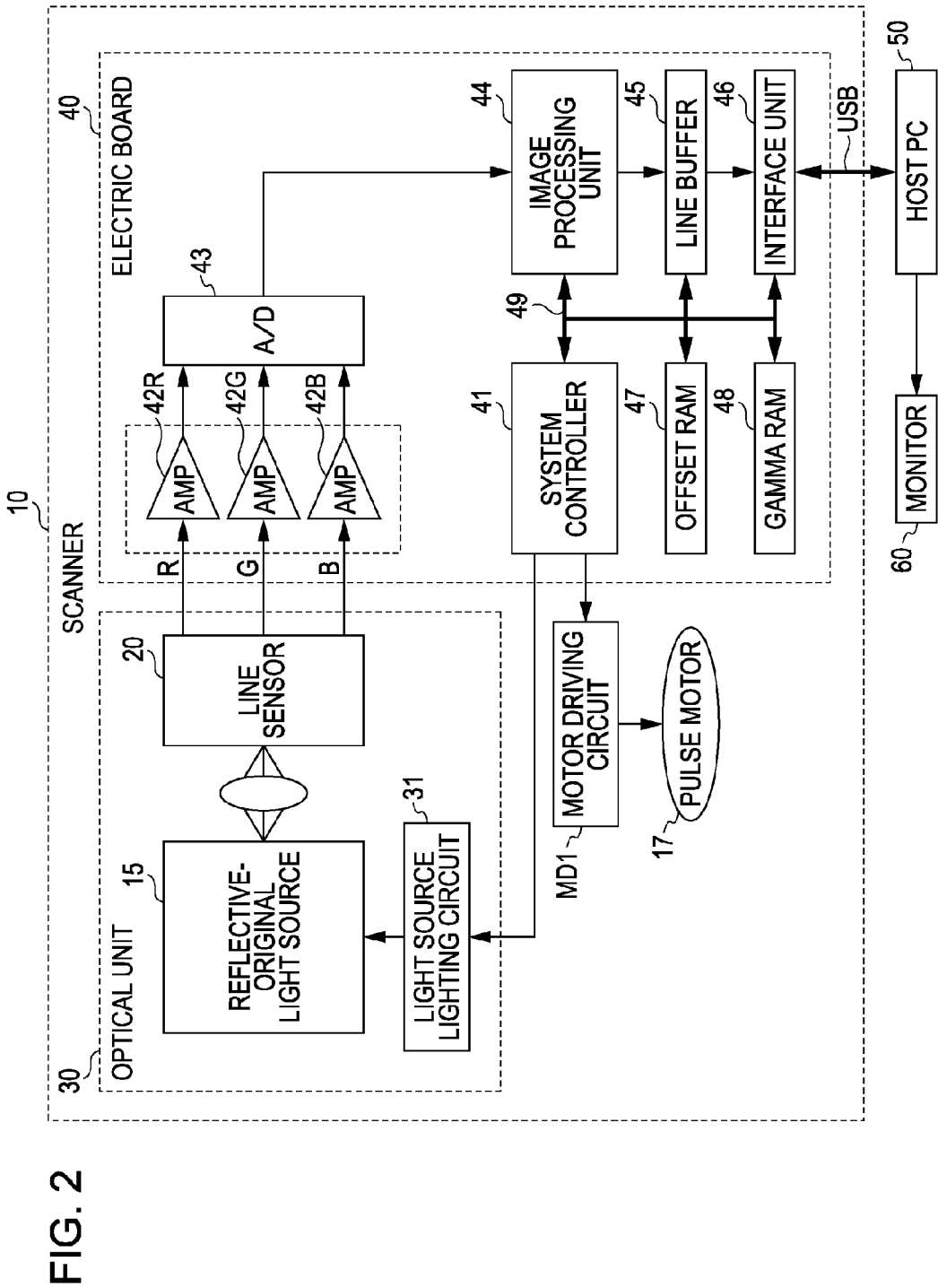
FIG. 2 is a block diagram illustrating a functional configuration of a scanner according to the first embodiment.

FIG. 2 is a block diagram illustrating a functional configuration of the scanner 10 according to the first embodiment.

The scanner 10 includes the optical unit 30, the electric board 40, the pulse motor 17, and a motor driving circuit MD1.

The optical unit 30 includes a light source lighting circuit 31. The light source lighting circuit 31 is a circuit for lighting the reflective-original light source 15, and includes a detecting unit for detecting light intensity of the reflective-original light source 15. In a case where a cold-cathode tube is used for the reflective-original light source 15, a so-called inverter circuit is formed.

The electric board 40 includes the system controller 41, analog gain amplifiers 42R, 42G, and 42B, an A/D (analog to digital) converter 43, an image processing unit 44, a line buffer 45, and an interface unit 46. Also, the electric board 40 includes an offset RAM (Random Access Memory) 47, a gamma RAM 48, and a CPU (Central Processing Unit) bus 49.

The analog gain amplifiers 42R, 42G, and 42B variably amplify analog image signals output from the line sensor 20. The A/D converter 43 converts the analog image signals output from the analog gain amplifiers 42R, 42G, and 42B into digital image signals. The image processing unit 44 performs image processing, such as offset correction, shading correction, digital gain adjustment, color balance adjustment, masking, resolution conversion in the main and sub scanning directions, and image compression, on the digital image signals.

The line buffer 45 includes a multi-purpose random access memory and temporarily stores image data. The interface unit 46 is formed of a USB (Universal Serial Bus) interface and communicates with the host PC 50. Another type of interface, such as an interface of IEEE 1394, may also be adopted as the interface unit 46.

The offset RAM 47 is a RAM that is used as a working area for performing image processing. Line sensors for RGB have individual predetermined offsets and are placed in parallel with the line sensor 20. Thus, the offset RAM 47 is used for correcting an offset among the line sensors for RGB. Also, the offset RAM 47 performs shading correction, temporary storage of various data, and the like. Here, the offset RAM 47 is realized by a multi-purpose random access memory. The gamma RAM 48 is a RAM for storing a gamma curve and performing gamma correction.

The system controller 41 stores a sequence of an entire film scanner and performs various controls in response to instructions provided from the host PC 50.

The CPU bus 49 mutually connects the system controller 41, the image processing unit 44, the line buffer 45, the interface unit 46, the offset RAM 47, and the gamma RAM 48, and includes an address bus and a data bus.

The motor driving circuit MD1 is provided for the pulse motor 17 and outputs an excitation switch signal for the pulse motor 17 in response to a signal supplied from the system controller 41, which is a system control unit of the scanner 10.

Next, a description will be given about a schematic configuration of the host PC 50 used to control the scanner 10 according to the first embodiment.

Figure 3:
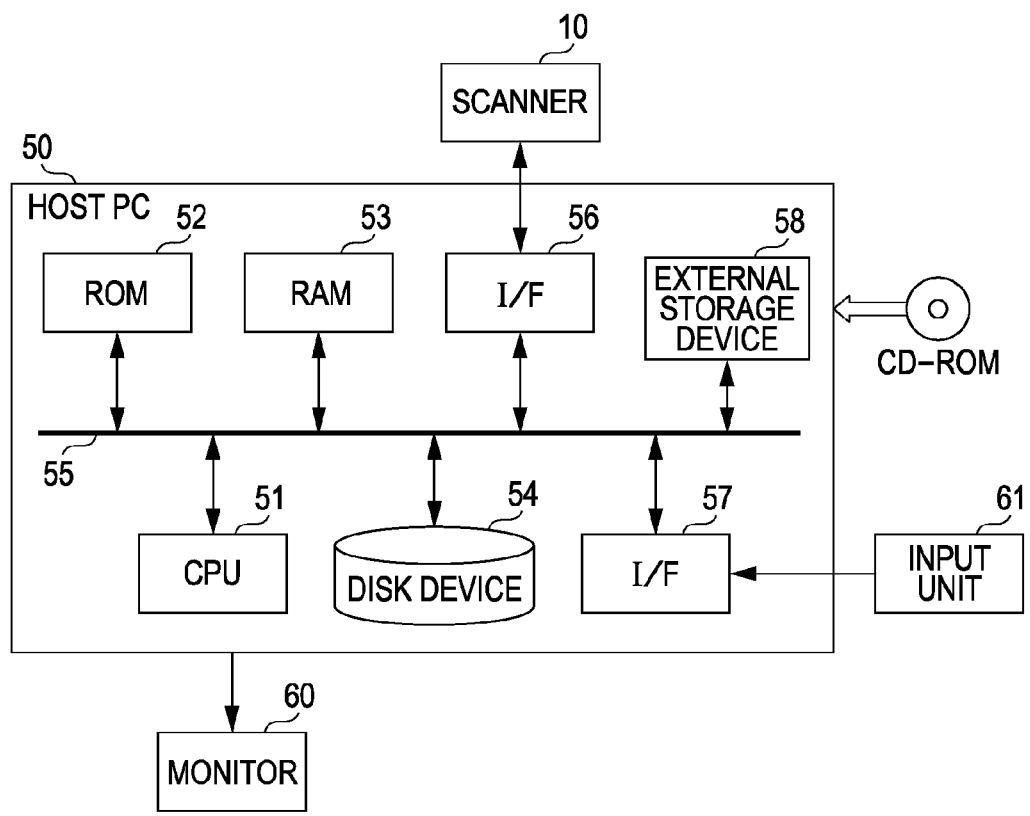
FIG. 3 illustrates a schematic configuration of a host PC that is used to control the scanner according to the first embodiment.

FIG. 3 illustrates a schematic configuration of the host PC 50 used to control the scanner 10 according to the first embodiment.

The host PC 50, which is connected to a monitor 60, includes a CPU 51, a ROM (Read Only Memory) 52, a RAM 53, a disk device 54, a bus 55, I/Fs (interfaces) 56 and 57, and an external storage device 58.

Figure 4:
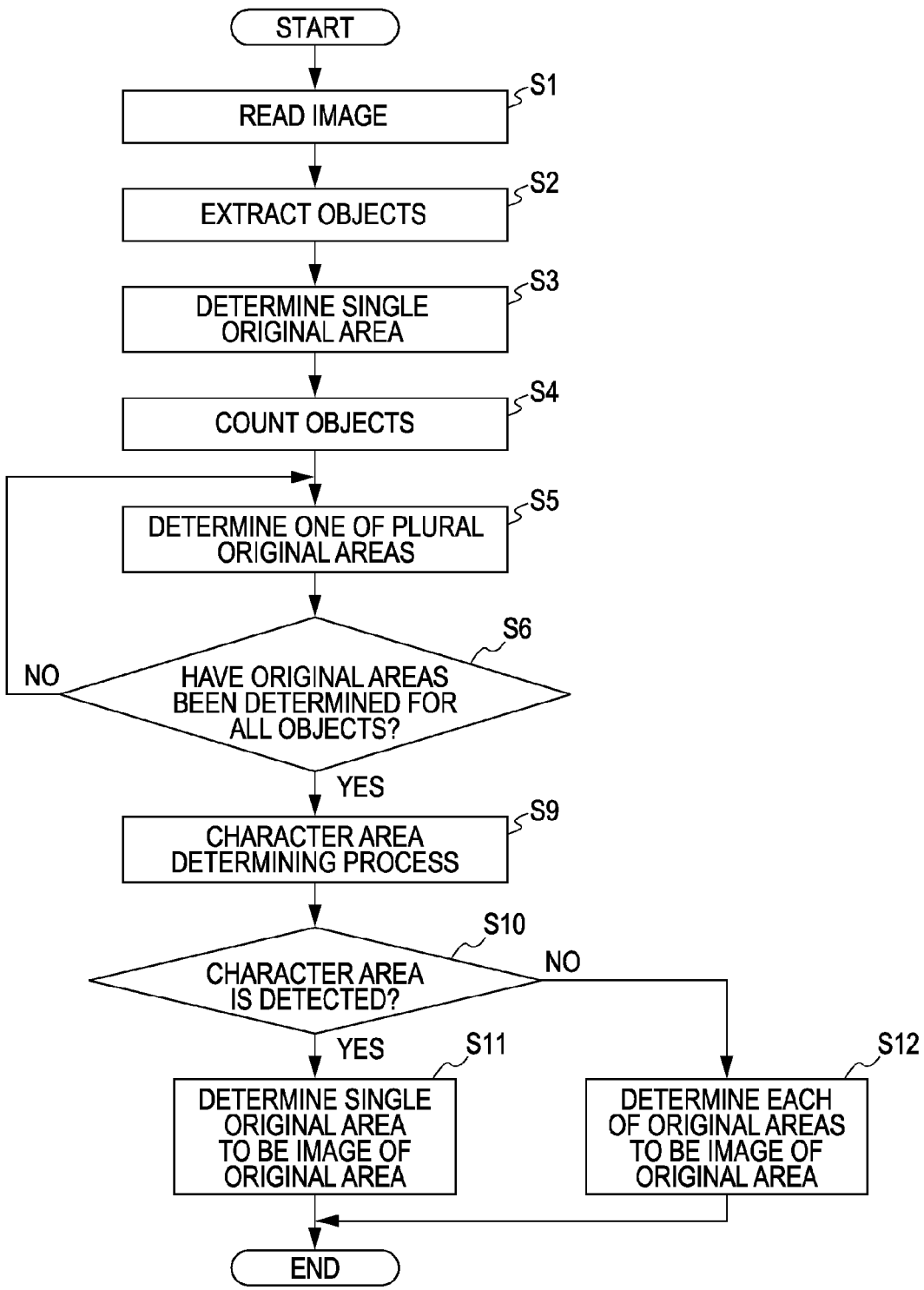
FIG. 4 is a flowchart illustrating a reading operation of the scanner performed by the host PC according to the first embodiment.

The ROM 52 holds a program for realizing the operation of the flowchart illustrated in FIG. 4. The RAM 53 provides a storage area and a work area necessary for the operation of the program. The CPU 51 performs a process in accordance with the program held in the ROM 52.

The bus 55 mutually connects the above-described devices to enable transmission and reception of data among the devices. The I/F 56 is used to perform communication with the scanner 10, and is realized by a USB interface as in the interface unit 46 of the scanner 10. Alternatively, another type of interface, such as an interface of IEEE 1394, may be adopted.

The I/F 57 is connected to an input unit 61, such as a mouse and a keyboard. The external storage device 58 is used for driving an external storage medium, such as a floppy (registered trademark) disk or a CD-ROM (Compact Disc Read Only Memory). In a case where the control program is stored in the external storage medium, not held in advance in the ROM 52 as described above, the I/F 57 reads and downloads the control program. Alternatively, the control program may be downloaded via a network and a network connector (not illustrated).

The scanner 10 is an example of a platen image obtaining unit configured to obtain a platen image by reading an original that contains an object to be read and that is placed on the platen glass G1.

The CPU 51 is an example of an extracting unit configured to extract an image area as the object to be read from the platen image.

Also, the CPU 51 is an example of a determining unit configured to determine whether each of image areas of a plurality of objects to be read has a specific characteristic of an original on the basis of the platen image. Also, the CPU 51 is an example of a judging unit configured to judge that an area including the image areas of the plurality of objects to be read is an image of an original area in a case where at least one of the image areas has the characteristic. Furthermore, the CPU 51 is an example of the judging unit configured to judge that each of the image areas is an image of an original area in a case where none of the image areas has the characteristic.

Furthermore, the CPU 51 is an example of an image extracting unit configured to extract a plurality of image areas included in the platen image.

The determining unit determines whether each of the plurality of image areas is a character area by using correlation values of distribution of edge strengths of respective sides in the individual image areas. Also, the determining unit varies a determination reference in accordance with the size of the respective image areas, and also varies the determination reference in accordance with the ratio between the width and height of the respective image areas.

Hereinafter, a reading operation of the scanner 10 performed by the host PC 50 according to the first embodiment will be described.

FIG. 4 is a flowchart illustrating the reading operation of the scanner 10 performed by the host PC 50 according to the first embodiment.

In step S1, the scanner 10 reads an image of the entire surface of the platen glass G1 including the original D1 placed on the platen glass G1. The resolution used to read the image may be either of a temporary resolution and a resolution desired by a user.

Figure 5:
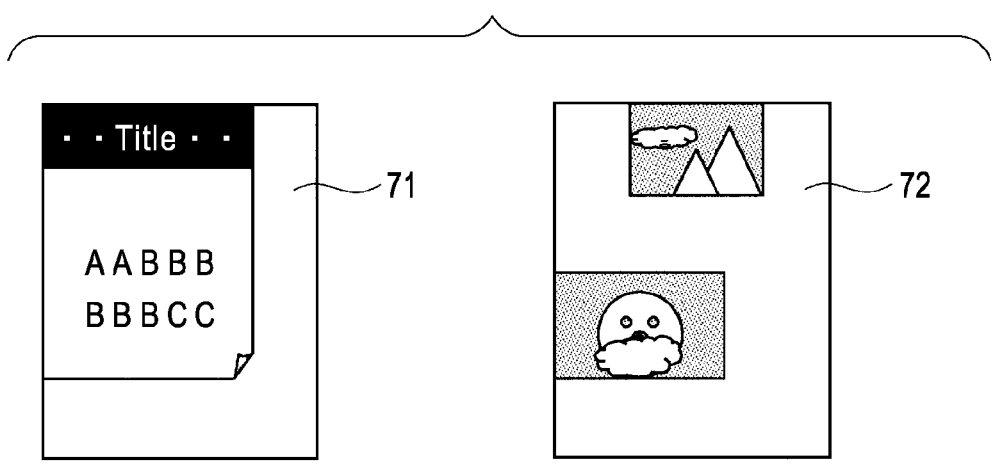
FIG. 5 illustrates an image of one page of a magazine and an image of two photographs according to the first embodiment.

FIG. 5 illustrates a platen image 71 obtained by reading one page of a magazine placed on the platen glass G1 and a platen image 72 obtained by reading two photographs placed on the platen glass G1.

In step S2, image areas which are objects to be read as an original area are extracted from the image of the entire surface of the platen glass G1. A specific extraction method will be described below with reference to FIG. 9.

In step S3, under the assumption that the original D1 is formed of a single original, an original area is determined on the basis of all the extracted objects. A specific method for determining the original area will be described below with reference to the flowchart illustrated in FIG. 10.

Figure 7:
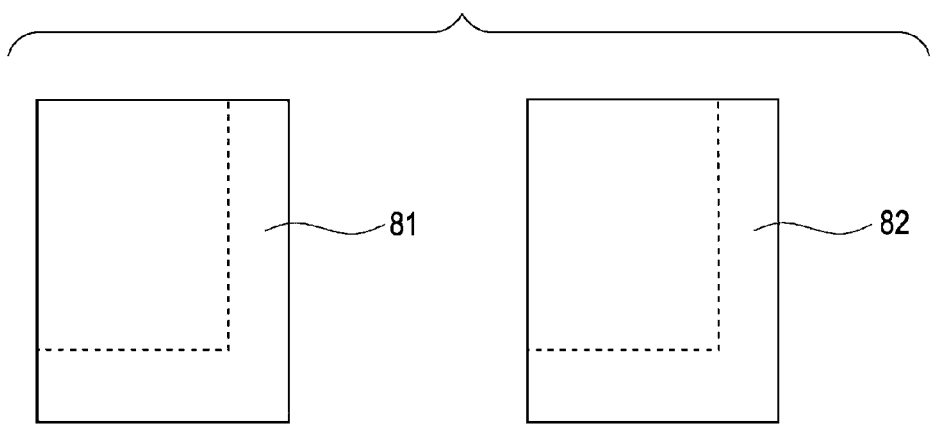
FIG. 7 illustrates original areas that have been determined, that is, an extraction result obtained from an image read from one page of a magazine and an extraction result obtained from an image read from a plurality of photographs according to the first embodiment.

Referring to FIG. 7, an extraction result 81, which is a dotted line indicating the original area determined in step S3, is obtained from a platen image in a case where one page of a magazine is placed on the platen glass G1 and is read by the scanner 10. On the other hand, an extraction result 82, which is a dotted line, is obtained from a platen image in a case where two photographs are placed on the platen glass G1 and are read by the scanner 10. That is, a minimum rectangular area including image areas of the two photographs is an extraction result.

The area obtained here is called "single original area".

In step S4, the number of image areas which are extracted as objects to be read is counted. As the extracted objects, the extraction result obtained in step S2 may be used. Alternatively, an extraction process may be performed again by changing the setting for extraction by using the extraction method used in step S2, and an extraction result obtained thereby may be used as the extracted objects.

In order to count the number of objects to be read, a labeling method can be used, for example. First, a counter is initialized to 0, an image is scanned, and pixels of an object to be read are searched for. If a count value is not set for a pixel of the object to be read, a present count value 0 and a label (e.g., A) are set for the pixel. Also, the same count value 0 and label A are set for an adjacent pixel of the object to be read. Furthermore, the same count value 0 and label A are set for a pixel adjacent to the pixel for which the count value and label have been newly set. After the count value and label have been set for all adjacent pixels constituting the object to be read, the count value is incremented by 1, and also the value of the label is updated. Then, the image is further scanned to search for an image area as an object to be read. If an image area exists, the count value is incremented and a new label is set. After scanning of the last pixel has ended, 1 is added to a count value N at that time. The value obtained thereby is the number of image areas which are extracted objects to be read.

In step S5, under the assumption that the original D1 is formed of a plurality of originals, a plurality of extracted image areas are determined to be original areas. At this time, for example, the original areas may be determined by inclining the original areas under the assumption that the photographs were placed obliquely.

Here, the original placed on the platen glass G1 is an original having a certain aspect ratio or smaller, e.g., an A4-size sheet or a standard-size photograph, and an extremely long original can be wrongly detected. If standard-size photographs are placed so as to overlap each other, image data in an overlapped area is not obtained, and thus the photographs are placed apart from each other. In view of these two conditions, in a case where the rectangular aspect ratio exceeds the certain aspect ratio or where the rectangles are in contact with each other, the determined original area may be excluded as an improper original area.

A specific determining method will be described below with reference to the flowchart illustrated in FIG. 10.

Figure 8:
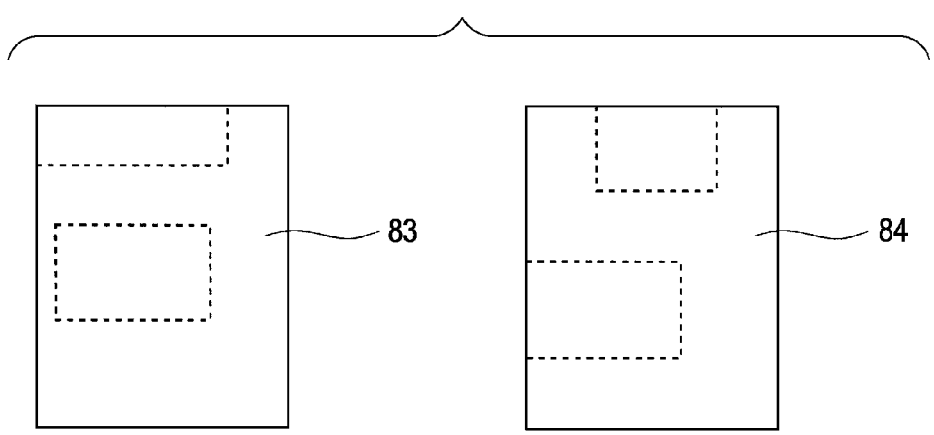
FIG. 8 illustrates original areas that have been determined, that is, an extraction result obtained from an image read from one original and an extraction result obtained from an image read from a plurality of originals according to the first embodiment.

FIG. 8 illustrates the original areas determined in step S5, that is, an extraction result 83 that is obtained from an image in a case where one original is placed on the platen glass G1 and an extraction result 84 that is obtained from an image in a case where a plurality of originals are placed on the platen glass G1.

Figure 6:
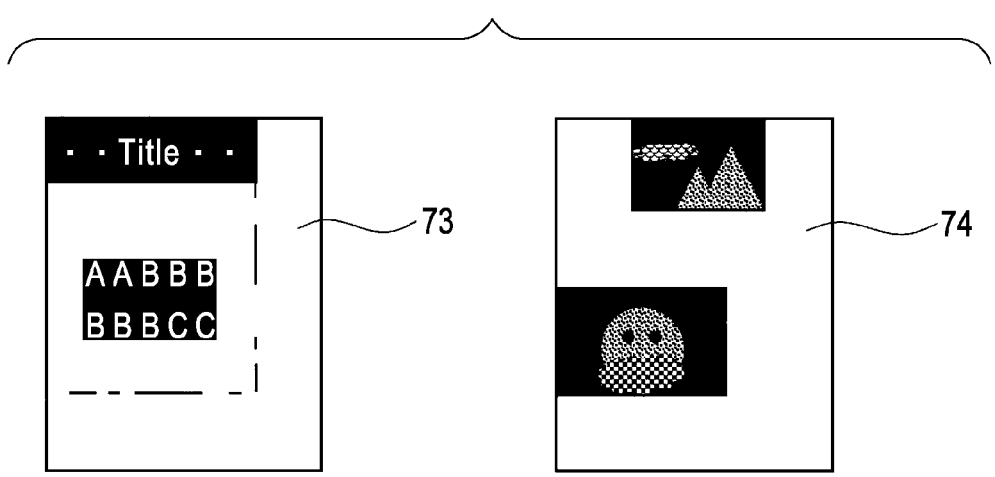
FIG. 6 illustrates an extraction result in a case where one page of a magazine is placed on a platen and an extraction result in a case where a plurality of photographs are placed on the platen according to the first embodiment.

In an extraction result 73 illustrated in FIG. 6, a lower side and a right side of an original are extracted, but these extracted sides are not reflected in the extraction result 83 illustrated in FIG. 8. This is because the rectangular aspect ratio or the size of an image area does not satisfy the condition or the rectangles are in contact with each other, and thus the extracted sides are excluded from the extraction result 83.

On the other hand, in the extraction result 84 illustrated in FIG. 8, it can be understood that the result obtained in step S5 is appropriately processed for images obtained by placing a plurality of originals on the platen glass G1. However, this result depends on the extraction result obtained in step S2, and a process can be appropriately performed depending on the extraction result. In the first embodiment, it is assumed that a process is not appropriately performed.

The plurality of areas obtained here are called "set of original areas" hereinafter.

If it is determined in step S6 that original areas have been determined for image areas as all the counted objects to be read, the process proceeds to step S9.

In step S9 and thereafter, the details of the set of original areas determined in step S5 are determined, and it is determined whether the original areas are a plurality of originals. For example, in a case where an original with a white background is placed on the platen glass G1 in the object extracting process performed in step S2, the white background should be extracted as an original area. However, in a case where the surface of the pressure plate 14 that contacts the platen glass G1 is white, the boundary between the original and the pressure plate 14 is not detected, which causes a wrong determination result in some cases. Such a wrong determination result and the determination made in step S5 may cause the inner area of an object to be determined as "set of original areas", although the inner area is actually an original area. In this case, if an object extracted in step S2 is a rectangle, a wrong determination result is likely to occur. This is because, when areas are determined in step S5, an area having an aspect ratio exceeding the certain aspect ratio and an area that is in contact with another area are excluded. In a case where an area determined in step S5 is a rectangle, e.g., a photograph, the photograph is not applied to an exclusion condition in step S5 and is thus determined as an area. Therefore, a rectangular area is likely to be wrongly determined.

For example, photographs that appear in a magazine are rectangular in many cases, which is likely to cause a wrong determination result. Image data in an image area can be examined to detect a photograph, but it is difficult to determine from an individual area whether the image data is a photograph in a magazine or an independent photograph as an object to be read.

Likewise, a character area that appears in an original is extracted as a rectangle in many cases, which is likely to cause a wrong determination result. Thus, it is determined whether an image area has a characteristic that an edge portion of the image area to be extracted as an original image is constituted by part of characters. Such determination is based on the assumption that the following situation does not occur: an original in which edges of all four sides of an extracted image are constituted by part of characters is put on the platen glass G1.

Accordingly, it is determined whether the set of original areas determined in step S5 is a wrong determination result.

If it is determined in step S10 that the determination result obtained in step S9 is an image area constituted by characters, the process proceeds to step S11. Otherwise, the process proceeds to step S12.

In step S11, the single original area determined in step S3 is determined to be an image of an original area.

In step S12, each of the image areas in the set of original areas determined in step S5 is determined to be an image of an original area.

After that, image processing can be performed on the basis of the original area(s) determined in step S11 or S12, although not illustrated. If the resolution of the image read in step S1 is a temporary resolution, the original area(s) determined in step S11 or S12 can be read at a desired resolution. If the original area(s) obtained in step S11 or S12 is (are) inclined, the image(s) may be rotated so that the inclination is corrected.

Figure 9:
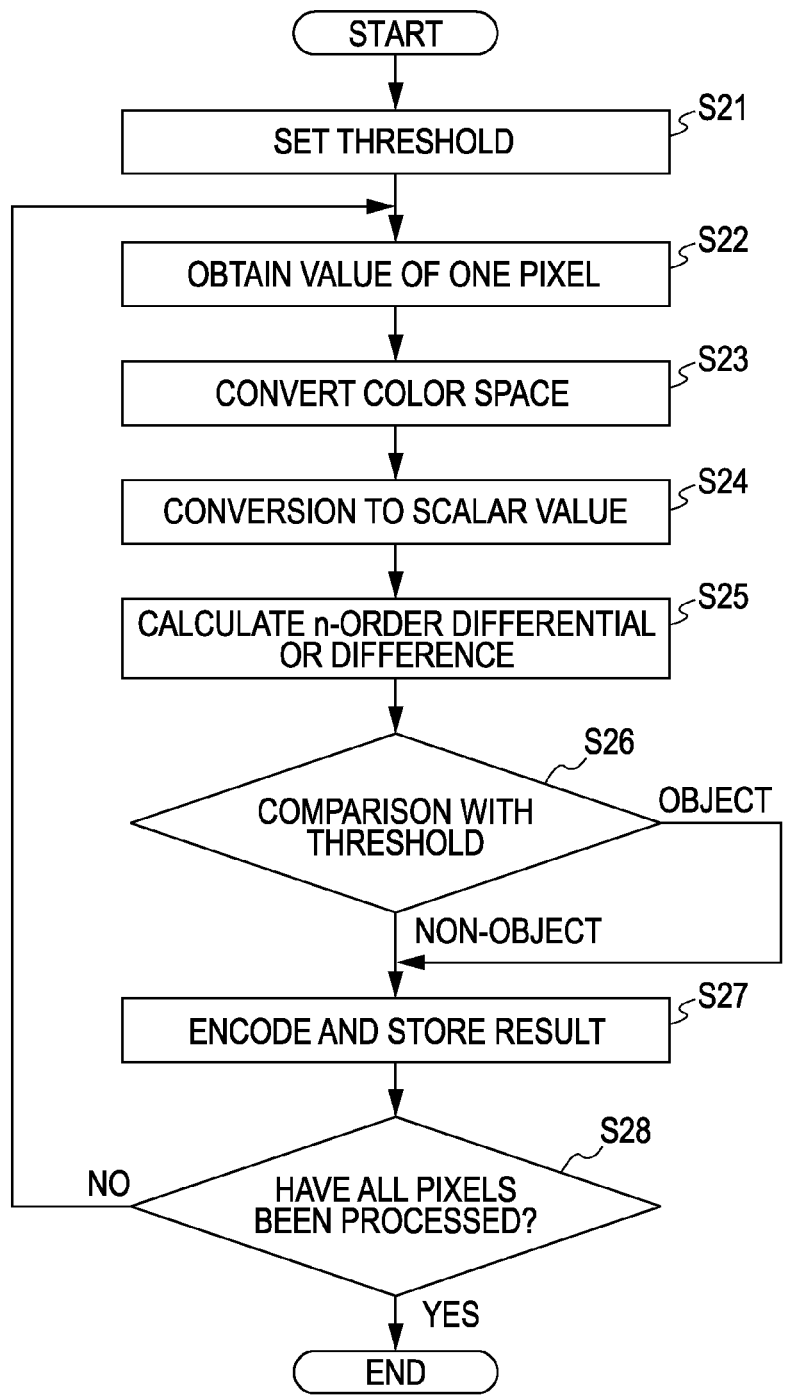
FIG. 9 is a flowchart illustrating an operation of extracting objects to be read according to the first embodiment.

FIG. 9 is a flowchart illustrating an operation of extracting objects to be read (step S2 in FIG. 4) according to the first embodiment.

In step S21, a threshold for binarizing an image is set. An optimal value of the threshold varies depending on a comparison method used in step S26 described below. In order to easily set the threshold, a fixed value may be set in advance.

In step S22, a value of one pixel is obtained. The process needs to be performed on all pixels to extract objects to be read from the image, and the process can be performed in units of pixels in step S22. In an ordinary case, the position of one pixel is specified by using X and Y coordinates. At the start of the process, the X and Y coordinates are initialized to initial values (typically 0). The X and Y coordinates are changed every time the process is performed on one pixel, and all pixels are scanned.

In step S23, the color space of the pixel value obtained in step S22 is converted. Typically, the color space of the scanner 10 varies depending on the characteristic and color filters of the line sensor 20 or the reflective-original light source 15. When the color space is independent of the device, an object to be read can be extracted without depending on the scanner 10. For this reason, the color space is converted in step S23. In a case where the threshold is determined in step S21 by adjusting a parameter depending on the scanner 10, step S23 can be omitted.

In step S24, the value obtained in step S23 is converted to a scalar value. In a case of inputting a color image, the color image has three color values of RGB. The three color values of RGB are converted to a scalar value so that the three color values of RGB (vector values) can be compared with the threshold (scalar value). In a case of converting the three color values of RGB into a scalar value, any of the following methods can be used: a method of taking any one of the colors; a method of performing appropriate weighted averaging on the three color values of RGB and obtaining a luminance value; and a method of calculating saturation on the basis of the three color values of RGB.

However, in a case of a single-color image, such as a gray-scale image, this process is unnecessary and thus step S24 can be omitted.

In step S25, an n-order differential or difference is calculated on the basis of the value obtained in step S24. In a process of extracting objects to be read from an image, extraction of a boundary between the original D1 placed on the platen glass G1 and the other area can enable accurate and easy determination of an original area thereafter. In order to extract the boundary of the original D1 placed on the platen glass G1, an n-order differential or difference is calculated. This process depends on the characteristic of the value obtained in step S24, and thus step S25 can be omitted if unnecessary.

In step S26, the value obtained in step S25 is compared with the threshold set in step S21. If the value is smaller than the threshold, it is determined that the pixel is not an object to be read. If the value is equal to or larger than the threshold, it is determined that the pixel is an object to be read. However, in accordance with the value obtained through steps S23 to S25, this relationship is reversed. That is, if the value is smaller than the threshold, it is determined that the pixel is an object to be read. If the value is equal to or larger than the threshold, it is determined that the pixel is not an object to be read. This relationship is set in advance. For example, in a case of using a luminance value, it may be determined that the pixel is an object to be read if the value is smaller than the threshold. In a case of using saturation, it may be determined that the pixel is an object to be read if the value is equal to or larger than the threshold.

In step S27, the result obtained in step S26 is stored. The result obtained in step S26 is either of an object to be read and not an object to be read. Thus, the result is stored by being encoded, e.g., an object to be read is represented by 0 whereas not an object to be read is represented by 1.

In step S28, it is determined whether the process from step S22 to step S27 has been performed on all the pixels. If the process has been performed on all the pixels, the process ends.

In the first embodiment, the process is performed in the order according to the flowchart illustrated in FIG. 9. In some cases, the result obtained in step S25 is necessary to set the threshold in step S21, and the scalar value obtained in step S24 of an adjacent pixel is necessary for calculation in step S25. For this purpose, the order of steps in the flowchart illustrated in FIG. 9 may be changed as necessary.

In the first embodiment, the process according to the flowchart illustrated in FIG. 9 is performed only once, but the process may be performed a plurality of times in some cases. At this time, the processing method may be changed. For example, in a first process, a luminance value is obtained without converting the color space, and the luminance value is processed on the basis of secondary differentiation. In a second process, saturation is obtained by converting the color space, and step S25 is skipped. After that, AND or OR of the two results is calculated to combine the two results. Which of AND and OR is to be used is determined depending on the encoding performed in step S27.

FIG. 6 illustrates an extraction result 73 that is obtained in a case where one page of a magazine is placed on the platen glass G1 and an extraction result 74 that is obtained in a case where a plurality of photographs are placed on the platen glass G1.

Referring to FIG. 6, black areas correspond to areas extracted as objects to be read.

Figure 10:
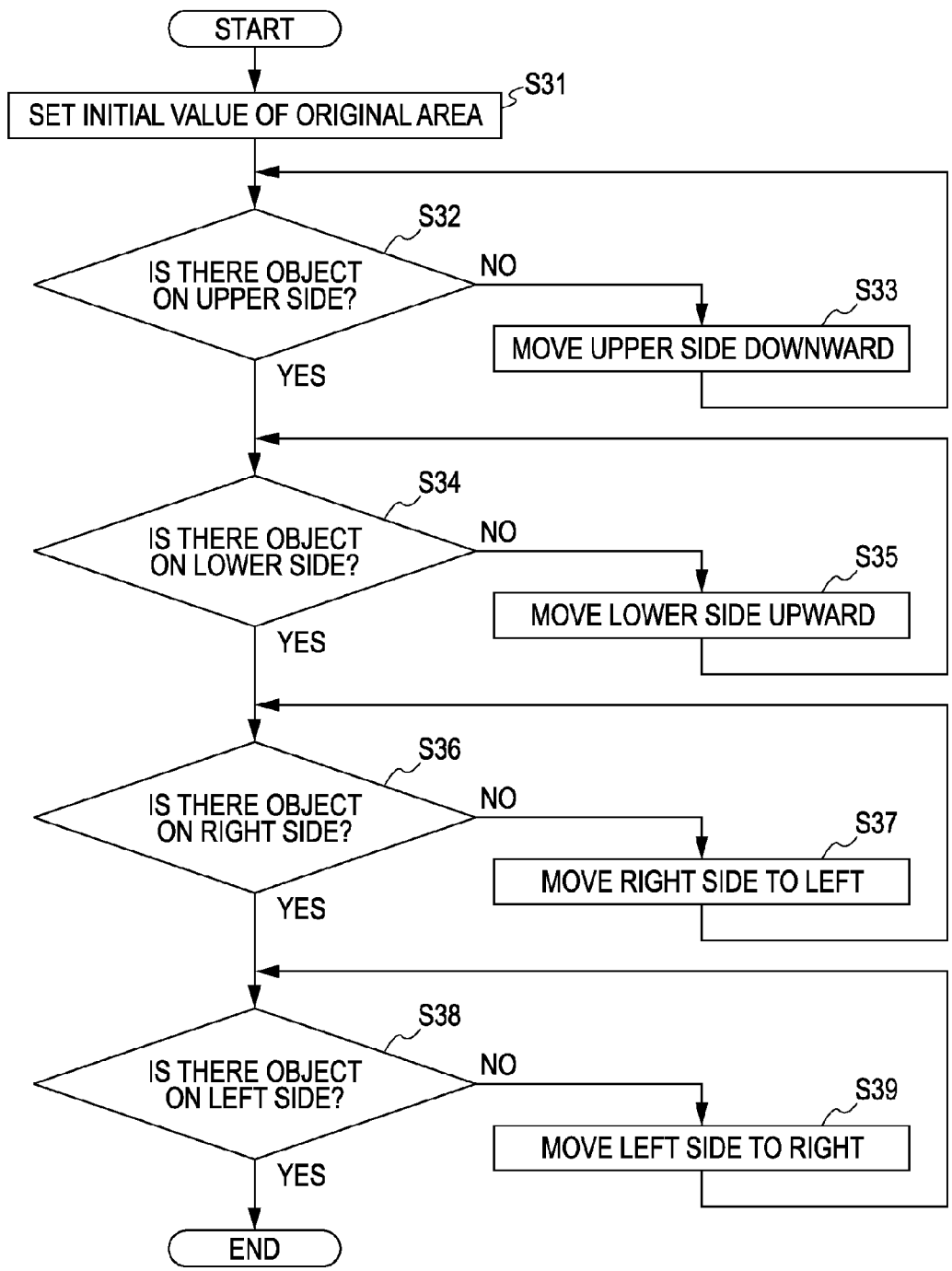
FIG. 10 is a flowchart illustrating an operation of determining an original area according to the first embodiment.

FIG. 10 is a flowchart illustrating a process of determining an original area (step S3 or S5 in FIG. 4) according to the first embodiment. In step S3, an original area is determined in the flowchart by processing the objects to be read extracted in step S2 as a single original. On the other hand, in step S5, original areas are determined in the flowchart by processing the respective objects to be read extracted in step S2 as a plurality of originals. The difference in object to be processed causes a difference in original area to be determined.

In step S31, an initial value of an original area is set. An entire area of the platen glass G1 is set as the initial value of the original area. In step S32, it is determined whether an object to be read extracted in step S2 exists on an upper side of the original area. If no object to be read exists on the upper side, the process proceeds to step S33. If an object to be read exists on the upper side, the process proceeds to step S34.

In step S33, the upper side of the original area is moved downward. In a case where the accuracy of the original area is set in units of pixels, the upper side is moved by one pixel. Then, the process returns to step S32. Performing steps S32 and S33 enables obtaining the upper side of the original area.

In step S34, it is determined whether an object to be read extracted in step S2 exists on a lower side of the original area. If no object to be read exists on the lower side of the original area, the lower side of the original area is moved upward in step S35. If an object to be read exists on the lower side of the original area, the process proceeds to step S36.

When the lower side of the original area is moved upward in step S35, in a case where the accuracy of the original area is set in units of pixels, the lower side is moved by one pixel. Then, the process returns to step S34. Performing steps S34 and S35 enables obtaining the lower side of the original area.

In step S36, it is determined whether an object to be read extracted in step S2 exists on a right side of the original area. If no object to be read exists on the right side, the right side is moved to the left in step S37 and the process returns to step S36. If an object to be read exists on the right side, the process proceeds to step S38.

When the right side of the original area is moved to the left in step S37, in a case where the accuracy of the original area is set in units of pixels, the right side is moved by one pixel. Then, the process returns to step S36.

Performing steps S36 and S37 enables obtaining the right side of the original area.

In step S38, it is determined whether an object to be read extracted in step S2 exists on a left side of the original area. If no object to be read exists on the left side, the process proceeds to step S39, where the left side of the original area is moved to the right. If an object to be read exists on the left side, the process ends.

When the left side of the original area is moved to the right in step S39, in a case where the accuracy of the original area is set in units of pixels, the left side is moved by one pixel.

Performing steps S38 and S39 enables obtaining the left side of the original area.

Also, the width and height of the determined object to be read are obtained. If the size of the object is small, it is determined that an original area does not exist. An object original is a business card or a standard-size photograph at the minimum. Thus, with sufficient consideration of a margin, if the margin is 1 inch or less, dust or the like can be determined to be an original area. Therefore, it is determined that an original area does not exist. The original area is determined in the above-described method.

With reference to FIGS. 7 and 8 that illustrate determination results, a process of making determination will be described.

FIG. 7 illustrates original areas extracted by using an original area determining method that is performed under the assumption that the original D1 is formed of one original.

The area defined by a dotted line is an original area. The extraction result 81 is obtained from an image that is read when one page of a magazine is placed on the platen glass G1. The extraction result 82 is obtained from an image that is read when a plurality of photographs are placed on the platen glass G1.

In the extraction result 81 illustrated in FIG. 7, it is understood that the result obtained in step S3 in FIG. 4 is appropriately processed. In the extraction result 73 illustrated in FIG. 6, part of the area is missing, but part of the upper, lower, right, and left sides of the original can be extracted. This is because an appropriate process has been performed in accordance with the flowchart illustrated in FIG. 10.

On the other hand, in the extraction result 82, the result obtained in step S3 does not match the individual areas of the originals, which is unfavorable. This is because, since the original area determining method based on the assumption that the original is formed of one original is used, a rectangular area including a plurality of image areas is determined to be an original area.

FIG. 8 illustrates original areas extracted by using an original area determining method based on the assumption that the original D1 is formed of a plurality of originals.

The area defined by a dotted line is an original area. The extraction result 83 is obtained from an image that is read when one page of a magazine is placed on the platen glass G1. The extraction result 84 is obtained from an image that is read when a plurality of photographs are placed on the platen glass G1.

In the extraction result 73 illustrated in FIG. 6, the lower and right sides of the original are extracted, but these sides are not reflected in the extraction result 83. This is because, since the width and height of the determined objects to be read are small, the extracted image is determined not to be an original area in view of the possibility that dust or the like is detected as an original area.

In the extraction result 84, it is be understood that the result obtained in step S5 is appropriately processed as images that are obtained when a plurality of originals are placed on the platen glass G1.

Figure 11:
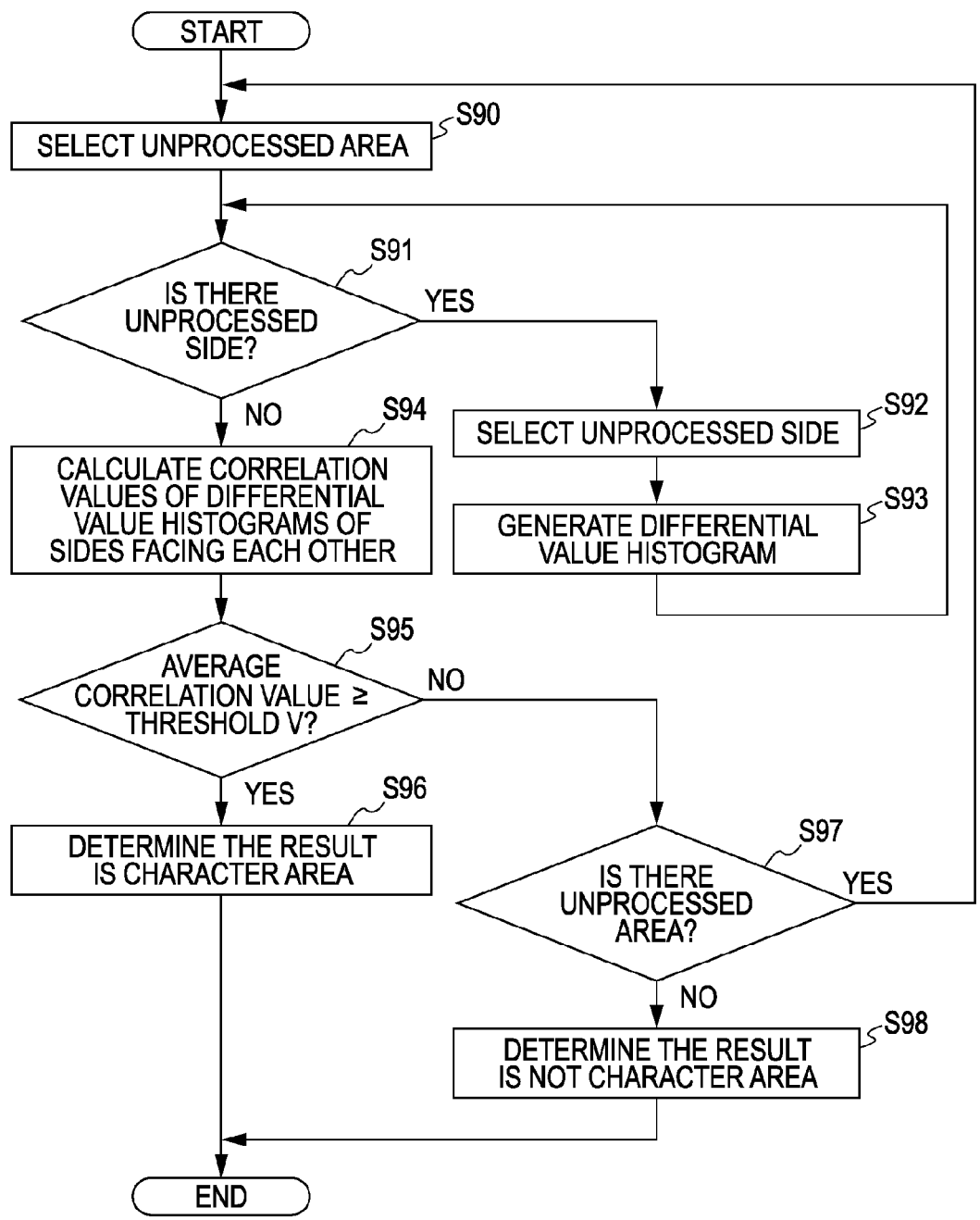
FIG. 11 is a flowchart illustrating an operation of determining whether an area is a character area according to the first embodiment.

FIG. 11 is a flowchart illustrating a process of determining whether an image area is constituted by characters (step S9 in FIG. 4) according to the first embodiment.

In step S90, an unprocessed area is selected from the set of original areas, and the process proceeds to step S91. Step S91 and the subsequent steps are performed on the area that is selected in step S90, and thus the area is called "selected area" hereinafter.

Figure 12:
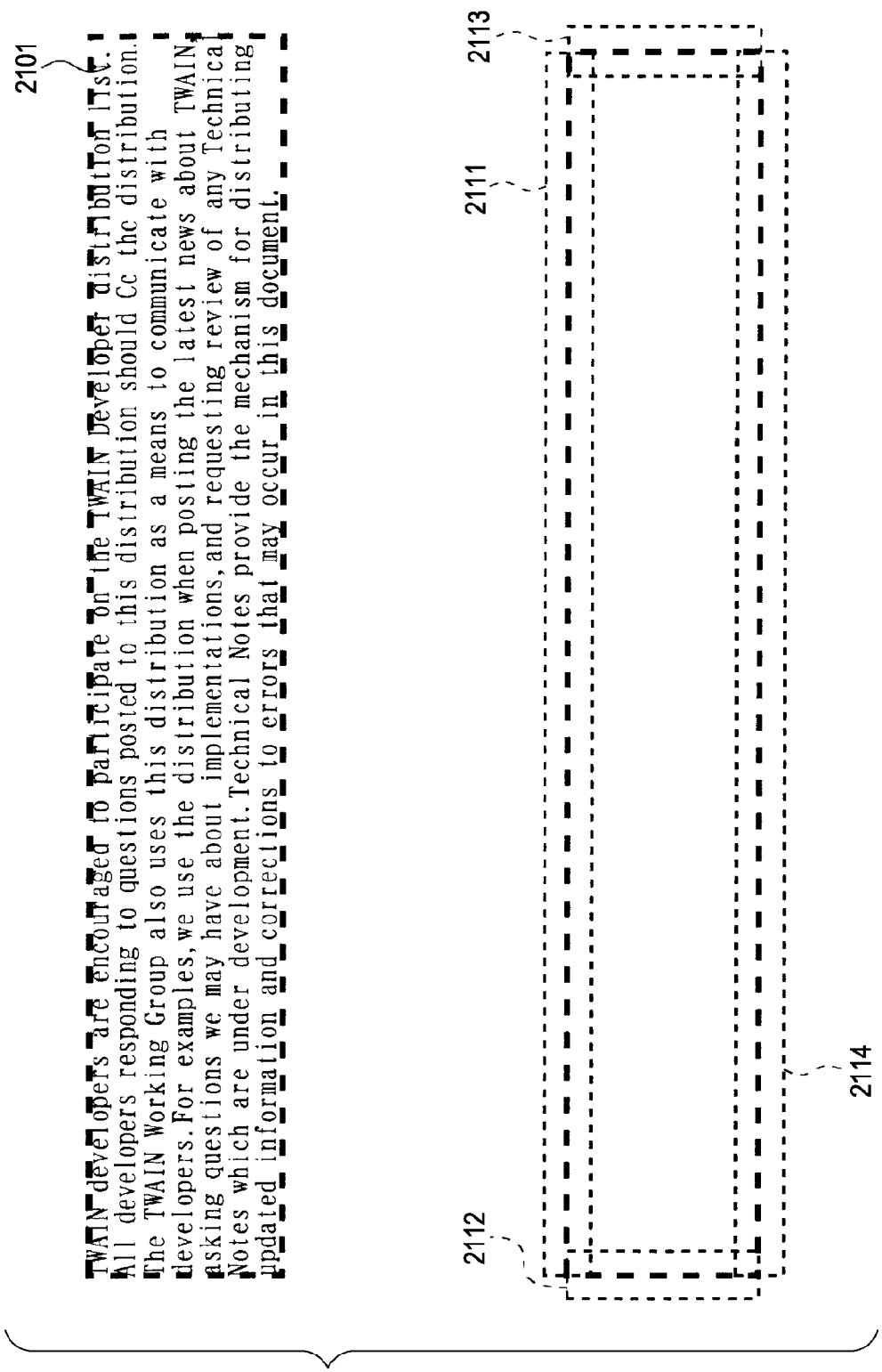
FIG. 12 illustrates a selected area that is extracted in a case where an area to be determined is a character area and areas that are used to generate differential value histograms for respective sides of the selected area.

FIG. 12 illustrates the extracted selected area 2101 and areas 2111, 2112, 2113, and 2114 that are used to generate differential value histograms.

In the first embodiment, the extracted selected area 2101 is a selected area extracted in a case where the area to be determined is a character area. The areas 2111, 2112, 2113, and 2114 are used to generate differential value histograms for respective sides of the selected area 2101 in step S93.

Referring to FIG. 12, a dotted line indicates sides that constitute an outline of the selected area.

In step S91, it is determined whether an unprocessed side exists among the sides of the selected area. If an unprocessed side exists, the process proceeds to step S92. If no unprocessed side exists, the process proceeds to step S94.

In step S92, an unprocessed side of the selected area is selected, and the process proceeds to step S93. Step S93 is performed on the side selected in step S92, and thus the side is called "selected side".

In step S93, absolute values of differential values in the vertical direction with respect to the selected side are calculated for all the pixels on the selected side, whereby a differential value histogram of the selected side is generated. Then, the process returns to step S91.

In the first embodiment, absolute values of differential values in the vertical direction with respect to the selected side are obtained for pixels within a short distance $\Delta$ in the direction vertical to the selected side from the pixels on the selected side, as in the areas 2111, 2112, 2113, and 2114 illustrated in FIG. 12. Then, the largest differential value is regarded as the differential value at the position on the selected side.

Figure 13:
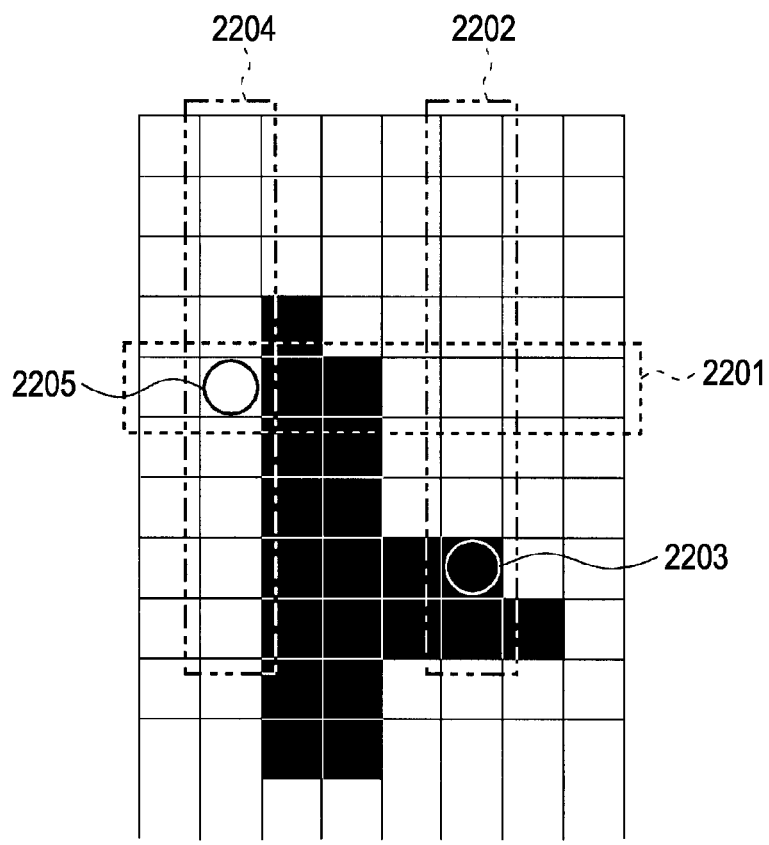
FIG. 13 illustrates a method for obtaining a differential value.

FIG. 13 illustrates a method for calculating the foregoing differential value.

Pixels in an area 2201 illustrated in FIG. 13 are pixels on the selected side. In the example in FIG. 13, as illustrated in an area 2202, differential values in the vertical direction in the figure are obtained for four pixels above the selected side and four pixels below the selected side, and the largest absolute value is regarded as the differential value in the area 2202. In this case, a boundary portion between a white pixel in a background area and a black pixel constituting a character has a largest differential value, and thus the differential value in an area 2203 serves as the differential value in the area 2202. Also, in an area not including a boundary portion between a pixel constituting a character and a pixel constituting a background area, as in an area 2204, the differential value having the largest absolute value in the pixels in the area is regarded as the differential value in the area 2204. In a case where all differential values are the same, a pixel on the selected line, i.e., the pixel in an area 2205 illustrated in FIG. 13, may be specified. In the example illustrated in FIG. 13, four pixels or less from the selected side are regarded as targets. Alternatively, an appropriate value may be obtained from information about the resolution of the read image or the like.

Figure 14:
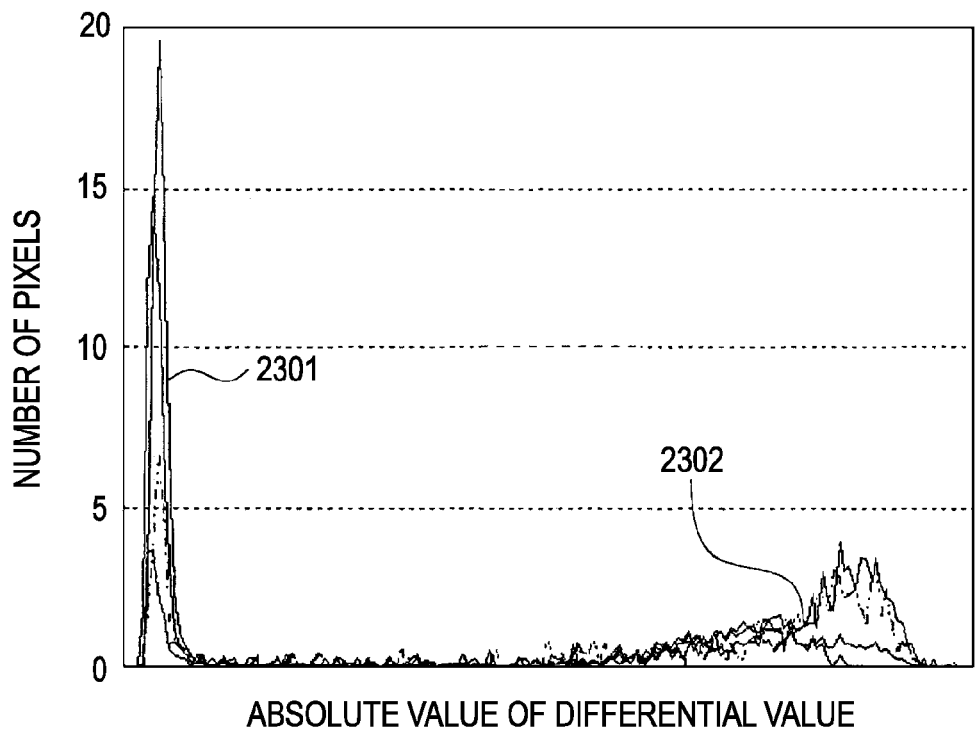
FIG. 14 illustrates an example of edge strength histograms of four sides of a selected area.
Figure 15:
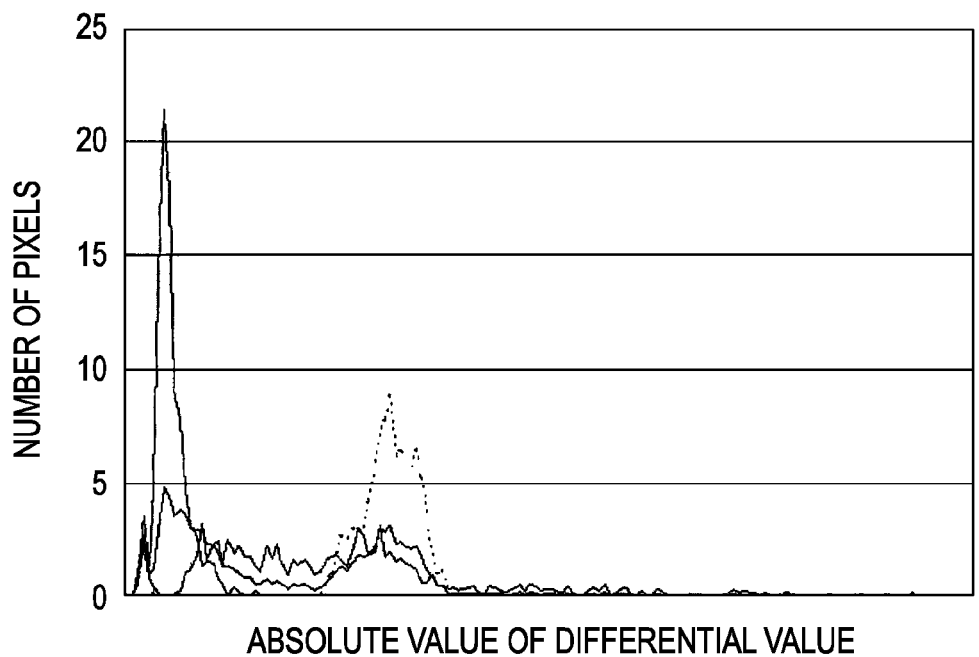
FIG. 15 illustrates another example of edge strength histograms of four sides of a selected area.

FIGS. 14 and 15 illustrate examples of edge strength histograms in the four sides of the selected area generated in step S93.

In FIGS. 14 and 15, the horizontal axis indicates the absolute value of the differential value, whereas the vertical axis indicates the number of pixels having the absolute value of the differential value indicated in the horizontal axis.

When the selected area is a character area, the generated histogram has two peaks as illustrated in FIG. 14: a set 2301 of pixels having differential values that are extremely approximate to 0 in all the four sides; and a set 2302 of pixels having certain large differential values.

A differential value extremely approximate to 0 like the differential value in the area 2204 illustrated in FIG. 13, as in the set 2301 of pixels, is obtained in a case where a boundary portion between a pixel constituting a character and a pixel constituting a background area does not exist in the area. A large differential value like the differential value in the area 2202 illustrated in FIG. 13, as in the set 2302 of pixels, is obtained in a case where a boundary portion between a pixel constituting a character and a pixel constituting a background area exists in the area.

When the selected area is not a character area, e.g., a photo area, no similarity is seen among generated histograms as illustrated in FIG. 15, so that the correlation among the histograms is low.

Referring back to FIG. 11, in step S94, correlation values between differential value histograms of sides facing each other of the selected area are obtained. An advantage of obtaining the correlation values between sides facing each other is that character spacing typically varies in the vertical direction and the horizontal direction in a case where the selected area is a character area, particularly where the selected area is a multi-columned sentence area. For example, in horizontal-writing sentences, character spacing in the horizontal direction is extremely small in an ordinary case, but line spacing in the vertical direction is larger than the character spacing in some cases. Therefore, when histograms are generated, a difference in ratio of a small differential value obtained in a background area (2301 in FIG. 14) to a large differential value obtain in a boundary portion between a background area and a character area between sides adjacent to each other can be large. In order to prevent such a problem, only correlation values between sides facing each other are used.

The above-described method is effective for both of vertical-writing sentences and horizontal-writing sentences.

In step S95, it is determined whether an average of the two correlation values calculated in step S94 is equal to or larger than a predetermined threshold V. If the average is equal to or larger than the threshold, the process proceeds to step S96. If the average is smaller than the threshold, the process proceeds to step S97.

In the first embodiment, if there is at least one selected area in which the average of correlation values is equal to or larger than the threshold V in step S95, it is determined that a character area exists. Alternatively, it may be determined that no character area exists if the number of such selected areas is not plural in accordance with the number of areas. In this case, the number of selected areas determined to be a character area is counted. When the count value reaches a predetermined value, the process proceeds to step S96. When the count value is smaller than the predetermined value, the process proceeds to step S97.

In the determination of an average correlation value performed in step S95, in a case where the dimension of the selected area is extremely approximate to a stereotyped sheet size or a stereotyped photograph size or where the ratio between height and width of the area is approximate to a predetermined ratio of an original, it is possible that the selected area is not a character area but is an individual original or photograph. Therefore, determination may be performed again by setting a high value as the threshold V so that wrong determination can be prevented.

In step S96, it is determined that the result is a character area. Since it has been determined that the result of step S9 in FIG. 4 is a character area, the process proceeds to step S11 through the determination in step S10.

In step S97, it is determined whether an unprocessed area exists. If an unprocessed area exists, the process returns to step S90. If an unprocessed area does not exist, it is determined that the result is not a character area. Since it has been determined that the result of step S9 in FIG. 4 is not a character area, the process proceeds to step S12 through the determination in step S10.

The above-described method for calculating differential values on sides of a selected area and determining a character area by using correlation has advantages in that the orientation of characters does not affect the accuracy and that a character area can be determined without using an OCR (Optical Character Reader) engine. Also, since determination is performed by extracting information of a plurality of differential value histograms from one area, a highly-reliable result can be obtained compared to a method of using a differential value of an entire area or distribution as an evaluation value. Furthermore, a process is performed on only pixels on sides of a selected area, and thus an original image can be determined at higher speed compared to a case where determination is performed by using pixels in an entire area.

Second Embodiment

A second embodiment is applied to a system including a plurality of apparatuses (e.g., a host computer, an interface apparatus, a scanner, a printer, an MFP (Multifunction Peripheral), and the like). A storage medium (or a recording medium) that stores a software program code for realizing the functions of the above-described embodiment may be supplied to the system or apparatus. Also, a computer (or CPU or MPU) of the system or apparatus may read and execute the program code stored in the storage medium.

That is, the above-described embodiment is applied to a program of controlling an image processing apparatus having a multi-cropping function that reads a plurality of originals at a time when the plurality of originals are placed on a platen of an image reading apparatus for scanning and that automatically extracts each of the read originals.

That is, the above-described embodiment is an example of a program for causing a computer to function as each unit constituting the image processing apparatus according to an embodiment.

In this case, the program code itself read from the storage medium realizes the functions of the above-described embodiment, and thus the storage medium storing the program code constitutes the present invention. The functions of the above-described embodiment are realized when the computer executes the read program code. In addition, an operating system (OS) or the like operating in the computer may execute part or all of actual processes on the basis of instructions of the program code, whereby the functions of the above-described embodiment may be realized.

Examples of the storage medium that stores the program code include a flexible disk, a hard disk, a ROM (Read Only Memory), a RAM (Random Access Memory), a magnetic tape, a nonvolatile memory card, a CD-ROM (Compact Disc Read Only Memory), a CD-R (Compact Disc Recordable), a DVD (Digital Versatile Disc), an optical disc, and an MO (magneto-optical) disc.

Furthermore, the program code read from the storage medium is written on a memory provided in a function expansion card inserted into the computer or a function expansion unit connected to the computer. After that, a CPU or the like provided in the function expansion card or the function expansion unit executes part or all of actual processes on the basis of instructions of the program code, whereby the functions of the above-described embodiment are realized.

According to the above-described embodiment, an original area having constant accuracy can be provided to both an inexperienced user and an experienced user. Therefore, a decrease in accuracy of an original area depending on a user can be effectively prevented.

Furthermore, a user operation of "selecting an appropriate process" is unnecessary, so that an image of an optimal original area according to an original can be obtained only by placing the original on a platen and pressing a read button by a user.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-330382 filed Dec. 25, 2008, which is hereby incorporated by reference herein in its entirety.

What is claimed is:

1. An image processing apparatus that specifies an original area corresponding to an original from a read image obtained by reading of the original by a reading apparatus, the image processing apparatus comprising:

an extracting unit configured to extract at least one candidate area which is a candidate of the original area, from the read image;

a determining unit configured to, in a case where the extracting unit extracts a plurality of candidate areas, determine a candidate area including a character from the plurality of candidate areas; and a specifying unit configured to, in a case where a plurality of candidate areas equal to or more than a predetermined plural number are determined by the determining unit, specify the original area including the plurality of candidate areas extracted by the extracting unit from the read image.

2. The image processing apparatus according to claim 1, wherein the determining unit determines whether an edge portion of the candidate area includes a character, and determines whether the candidate area includes a character according to the determination for the edge portion.

3. The image processing apparatus according to claim 2, wherein the extracting unit extracts a candidate area of a rectangle, and the determining unit calculates a correlation value edge strengths of sides facing each other of the candidate area, and determines whether the edge portion of the candidate area includes a character, based on the calculated correlation value.

4. The image processing apparatus according to claim 1, wherein the determining unit determines the candidate area including a character in accordance with a size or a shape of each of the plurality of candidate areas.

5. The image processing apparatus according to claim 1, wherein in a case where a plurality of candidate areas equal to or more than the predetermined plural number are not determined by the determining unit, the specifying unit specifies each of the plurality of candidate areas extracted by the extracting unit as the original area corresponding to each of a plurality of originals.

6. An image processing method for specifying an original area corresponding to an original from a read image obtained by reading of the original is placed, the image processing method comprising:

an extracting step of extracting at least one candidate area which is a candidate of the original area, from the read image;

a determining step, in a case where the extracting unit extracts a plurality of candidate area, of determining a candidate area including a character from the plurality of candidate areas; and a specifying step to specify the original area including the plurality of candidate areas extracted by the extracting unit from the read image in a case where a plurality of candidate areas equal to or more than a predetermined plural number are determined by a determining unit.

7. A non-transitory computer-readable recording medium storing a program that causes an image processing apparatus to specify an original area corresponding to an original from a read image obtained by reading of the original by a reading apparatus, the program causing the image processing apparatus to execute:

an extracting step of extracting at least one candidate area which is a candidate of the original area, from the read image;

a determining step, in a case where the extracting unit extracts a plurality of candidate area, of determining a candidate area including a character from the plurality of candidate areas; and a specifying step to specify the original area including the plurality of candidate areas extracted by the extracting unit from the read image in a case where a plurality of candidate areas equal to or more than a predetermined plural number are determined by a determining unit.

* * * * *